United States Patent [19]

Gallo, Sr.

[11] 4,393,622

[45] Jul. 19, 1983

[54] WATER FUNNEL AND CARD HOLDER FOR CUT FLOWERS

[75] Inventor: Joseph S. Gallo, Sr., Walpole, Mass.

[73] Assignee: Dakota Plastics Company, Watertown, S. Dak.

[21] Appl. No.: 324,864

[22] Filed: Nov. 25, 1981

[51] Int. Cl.³ .............................................. A01G 29/00
[52] U.S. Cl. ..................................... 47/48.5; 40/10 C
[58] Field of Search ............................ 47/48.5, 47, 70; 40/10 C

[56] References Cited

U.S. PATENT DOCUMENTS

| | | | |
|---|---|---|---|
| 1,586,676 | 6/1926 | Heath | 47/48.5 X |
| 1,998,031 | 4/1935 | Thomas | 40/10 C |
| 2,809,468 | 10/1957 | Eliot | 47/48.5 X |
| 3,057,093 | 10/1962 | Gallo | 47/47 X |
| 3,188,771 | 6/1965 | Ballai | 47/47 |
| 4,037,361 | 7/1977 | Murphy et al. | 47/48.5 |
| 4,158,269 | 6/1979 | Williams et al. | 47/48.5 |

Primary Examiner—Robert E. Bagwill
Attorney, Agent, or Firm—Harvey B. Jacobson

[57] ABSTRACT

A water funnel and card holder arrangement for insertion into a block of foam plastic to supply water to cut flowers having their cut ends inserted into the block. The arrangement is a unitary structure having a funnel including a card carrying surface with retainer clips for receiving a card and the funnel feeds water to an elongated tubular member having its upper end joined to the funnel and its lower end including a plurality of spaced apertures to discharge water. A pointed tip member closes the lower end of the tubular member and has a maximum diameter which exceeds the diameter of the tubular member, thereby providing an annular space in the block of foam plastic into which water flows from the tubular member. An optional card support may be provided that consists of a pair of slits in the top edge of the funnel.

6 Claims, 4 Drawing Figures

WATER FUNNEL AND CARD HOLDER FOR CUT FLOWERS

BACKGROUND OF THE INVENTION

The invention relates to a water funnel and card holder arrangement for cut flowers and the like inserted into a block of foam plastic material. More particularly, the invention is directed to a new unitary structure including a water funnel and card holder to funnel water into a tubular member having a pointed tip extending therefrom so that the unitary structure may be inserted into the foam plastic material with the tubular member including apertures enabling water to pass into the foam material for prolonging the "life" of the cut flowers.

FIELD OF THE INVENTION

Watering of cut flower arrangements supported in floral foam can be difficult or messy because the flowers, due to their own foliage, block access to the bowl which supports the flowers and the foam block thus necessitating parting of the flower arrangement for adding water or putting the whole arrangement under a faucet for adding water and letting it sit and dry off before returning it to a given location. The present invention provides an improved arrangement for watering such floral arrangements in which the arrangement is sufficiently tall so as to extend to the top of the floral arrangement, and having a tubular member of a generally thin walled material that can easily be cut to provide adjustment in the over-all height of the apparatus. A pointed tip for closing off the bottom of the tubular container has a maximum diameter that is greater diameter than the tubular member and provides for creation and maintenance of a generally annular opening or space surrounding the tubular member and its apertures or holes and permitting water to flow out of the tubular member in an unimpeded manner into and onto the foam within which it is inserted. The tubular member and funnel form a structure extending to the top of the floral arrangement on which there is integrally formed a card holder to hold a card having indicia thereon forming a message. The card holder may be clips or a pair of slits cut in the lip of the funnel to retain the card bearing the message.

DESCRIPTION OF PRIOR ART

Various forms of card holders as well as watering arrangements and methods are known and representative prior art devices are disclosed in the following U.S. Pat. Nos.:
1,586,676—June 1, 1926—Heath
2,306,165—Dec. 22, 1942—Irish
2,809,468—Oct. 15, 1057—Eliot
3,057,093—Oct. 9, 1962—Gallo
4,037,361—July 26, 1977—Murphy et al
4,158,269—June 19, 1979—Williams et al.

None of these patents, whether taken and viewed singly or in comsination with each other, are believed to have a bearing on the patentability of any claim of this invention.

SUMMARY OF THE INVENTION

An object and advantage of the present invention is to provide an improved and unitary device intended to be installed in a bowl of cut flowers for adding water to a block of foam plastic supporting the cut flowers and in which there is carried a card having a message that is available for reading.

Another object and advantage of the present invention is to provide an improved watering and card supporting arrangement capable of being manufactured at low cost compared to the cost of the several components necessary to accomplish the separate functions and which is easily constructed of tubes of varying heights or lengths and other readily available components.

An additional and further object of the present invention is to provide a structure that facilitates rewatering bouquets of cut flowers supported in a foam plastic block by pouring water into a funnel so that the water goes down the funnel and into a tube and out of holes in the tube which has been inserted in the foam block for soaking the foam block which has an annular space therein between the tube and the foam block. The structure has a card holder that does not need to be removed in order to add water to the arrangement.

Another and further object of the invention is to provide an alternate card holder and funnel arrangement so that a selection of locations for a card having a message is provided without interfering with rewatering the bouquet of cut flowers by the step of adding water through the funnel.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENT

Figure 1:
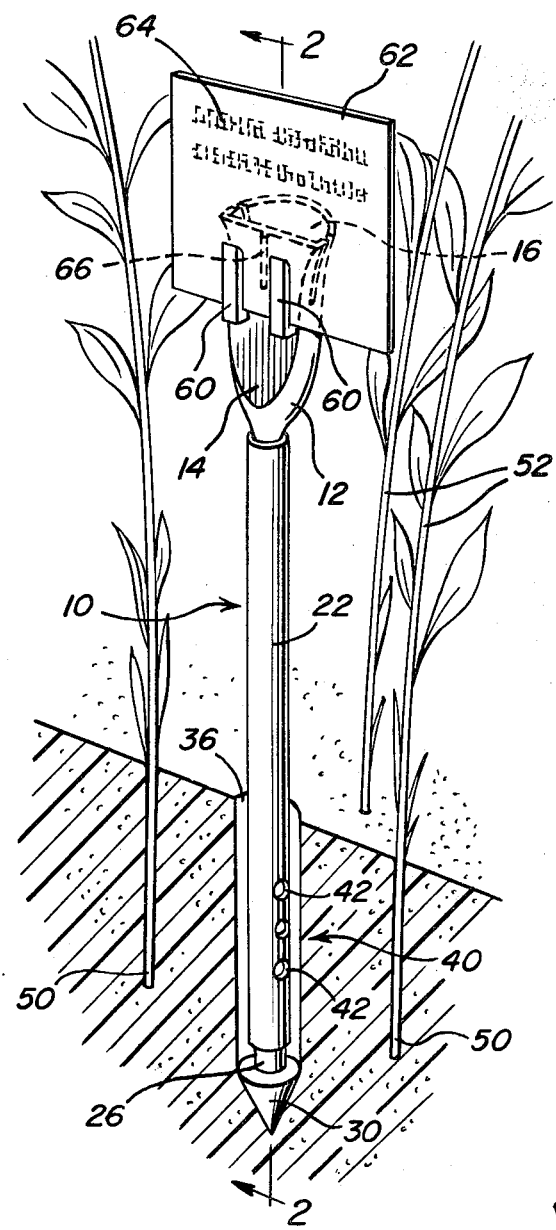
FIG. 1 is a perspective view partially in section of a preferred embodiment and best mode of the present invention.
Figure 2:
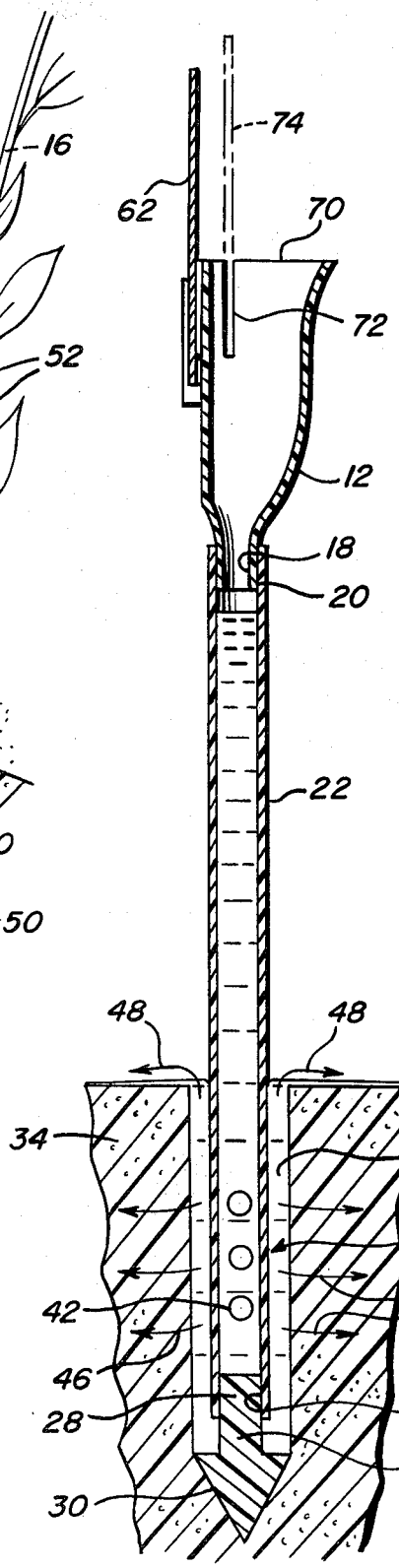
FIG. 2 is a sectional view taken along line 2—2 of FIG. 1.
Figure 3:
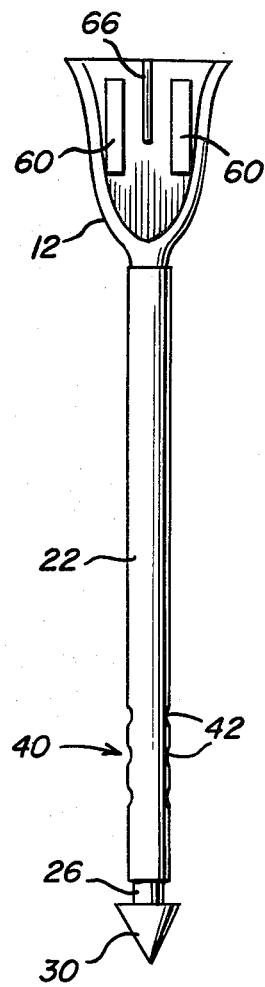
FIG. 3 is a front elevational view of the apparatus of the invention.
Figure 4:
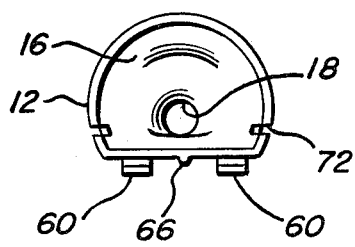
FIG. 4 is a top view of the apparatus of FIG. 3.

Referring now to the drawings there is shown a water funnel and card holder arrangement 10 which includes, as a unitary structure, a sculptured funnel 12 provided with a flat, vertically disposed card supporting face 14, the funnel having a large opening 16 at one end for receiving water and passing the water through the funnel to a small opening 18 at the other end. The other end 18 is matingly engaged into an upper opening 20 of a tubular member 22. At the other end of the tubular member 22 is a lower opening 24 for matingly engaging a tip member 26 having its neck portion 28 fittingly engaging within the lower opening 24, and the tip member 26 terminating in a conical point member 30.

A maximum diameter of the point member 30 is larger than the outside diameter of the tubular member 22 so that when the unitary structure 12-30 is inserted into a foam block 34, there results an annular space 36 defined as the space between the outer diameter of the tubular member 22 and the inner diameter of a cylindrical opening in the foam block caused by piercing of the point member 30 therewithin.

The lower end portion 40 of the tubular member 22 is provided with a plurality of holes or openings 42 arranged in vertically and circumferentially spaced relation for the egress of water that is poured into the funnel 12. The water passes through the tubular member 22 and out of the holes 42 into the annular space 36 and thence into the foam block 34. When the annular space 36 is filled and water passes into the foam block 34, as shown by arrows 46, the water then overflows the annular space 36 as shown by arrows 48 and thence the foam block 34 is completely immersed in water so that the cut stem 50 of the flowers 52 are adequately rewatered or watered as the occasion may exist.

Disposed on the card support face 14 of the funnel 12 there is a pair of clips 60 supported from the face 14 at their lower extremity and extending upwardly therefrom for receiving therein a card 62 having a message or other indicia 64 thereon as shown in FIG. 1. In order to provide a friction relation between the card 62 and the clips 60, there is provided a structural component or raised rib 66 positioned generally centrally of the card support face 14 and intermediate the clips 60 for providing the friction relationship or bite upon the card 62 so that it does not blow away, fall out or otherwise become misplaced during normal use or when water is poured into the funnel. Also, extending downwardly from the upper lip 70 of the funnel 12 is a pair of slits 72 of sufficient size that may also provide a friction fit or bite upon a card 74 shown in phantom. This provides an optional or alternative arrangement for holding a message card.

The tubular member 22 can be cut to a predetermined length and then assembled with the funnel 12 at one end and the tip member 26 at the other for insertion into the foam block 34. The tubular member 22 may be of a thin wall plastic or similar material, similar to a drinking straw. It is friction fitted to the funnel 12 and tip member 26 by a tapered joint. Any number of holes 42 may be cut into the lower portion 40 of the tubular member for allowing for fast dispersal of the water. The arrangement 12–30 is a unitary construction for receiving water poured into the funnel and directing it to the tubular member 22 for distribution through the openings 42 and into the foam block 34. The length of the unitary structure can be predetermined so that the card support face 14 extends generally at the height of the flowers whereupon cards or other message indicia elements can be inserted into the clips 60 or the slits 72 where they are easily seen and capable of being read. The slits are generally positioned offset from the center of the funnel so water can be added centrally to the funnel 12 as desired. This arrangement has the advantage of simple design and construction of manufacture without the card or message element being in the way of filling the funnel with water.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A water funnel arrangement for cut flowers including a unitary structure for funnelling water into a container having foam plastic material for receiving cut ends of cut flowers, the arrangement comprising:

a funnel having its large opening for receiving water and its small opening for passing water therefrom, a tubular member having an opening at its upper end to receive the small opening of the funnel and for passing water through the tubular member to its lower end, said tubular member having at least one aperture proximate the lower end for discharging water therefrom and a pointed tip means closing the lower end of the tubular member below the aperture and having a pointed portion insertable into the foam plastic, said pointed portion having a maximum dimension greater than the external dimension of the tubular member to provide a cavity in the foam plastic above the pointed portion to receive water discharged from the aperture and enabling water to contact the foam plastic throughout the height of the cavity and along the top surface of the foam plastic, said funnel including a pair of slits formed therein extending downwardly from the upper edge thereof for holding a card having indicia.

2. The invention of claim 1 including additional apertures in said tubular member proximate its lower end in vertically and circumferentially spaced relation to said at least one aperture.

3. The invention of claim 1 wherein said tubular member is an elongated cylindrical member, said pointed portion of the tip means being conical with the apex remote from and aligned with the tubular member to form a cavity of cylindrical configuration in the foam plastic with the annular space between the tubular member and the inner surface of the cavity being substantially constant throughout its height.

4. The invention of claim 3 wherein the funnel, the tubular member and the pointed tip means are constructed of plastic material formed as separate parts and secured together by tapered telescopic joints.

5. A water funnel arrangement for cut flowers including a unitary structure for funnelling water into a container having foam plastic material for receiving cut ends of cut flowers, the arrangement comprising:

a funnel having its large opening for receiving water and its small opening for passing water therefrom, a tubular member having an opening at its upper end to receive the small opening of the funnel and for passing water through the tubular member to its lower end, said tubular member having at least one aperture proximate the lower end for discharging water therefrom and a pointed tip means closing the lower end of the tubular member below the aperture and having a pointed portion insertable into the foam plastic, said pointed portion having a maximum dimension greater than the external dimension of the tubular member to provide a cavity in the foam plastic above the pointed portion to receive water discharged from the aperture and enabling water to contact the foam plastic throughout the height of the cavity and along the top surface of the foam plastic, said clip means including a pair of vertically disposed upwardly opening clips, said funnel having a flat, vertical wall portion on which the clips are mounted, and rib means on the outside surface of said funnel disposed between the clips to provide a bite upon the card for holding it in place.

6. The invention of claim 5 wherein said funnel is sculptured and provided with a curved vertical wall portion compatible in color and configuration to the cut flowers whereby a casual observer will be less likely to notice the presence of the water funnel arrangement.

* * * * *